(12) United States Patent
Tischler et al.

(10) Patent No.: US 7,799,422 B2
(45) Date of Patent: Sep. 21, 2010

(54) ABSORBING FILM (75) Inventors: Jonathan Tischler, Sharon, MA (US); Michael Scott Bradley, Cambridge, MA (US); Vladimir Bulovic, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 562 days.

(21) Appl. No.: 11/265,109

(22) Filed: Nov. 3, 2005

(65) Prior Publication Data
US 2006/0159901 A1 Jul. 20, 2006

Related U.S. Application Data (60) Provisional application No. 60/624,198, filed on Nov. 3, 2004.

(51) Int. Cl.
B32B 27/06 (2006.01)
(52) U.S. Cl. ........................................ 428/338; 428/420
(58) Field of Classification Search ........................ None
See application file for complete search history.

(56) References Cited

U.S. PATENT DOCUMENTS

| | | | |
|---|---|---|---|
| 5,260,957 A | 11/1993 | Hakimi et al. |
| 5,293,050 A | 3/1994 | Chapple-Sokol et al. |
| 5,354,707 A | 10/1994 | Chapple-Sokol et al. |
| 5,422,489 A | 6/1995 | Bhargava |
| 5,505,928 A | 4/1996 | Alivisatos et al. |
| 5,512,131 A | 4/1996 | Kumar et al. |
| 5,525,377 A | 6/1996 | Gallagher et al. |
| 5,537,000 A | 7/1996 | Alivisatos et al. |
| 5,585,640 A | 12/1996 | Huston et al. |
| 5,613,140 A | 3/1997 | Taira |
| 5,677,545 A | 10/1997 | Shi et al. |
| 5,751,018 A | 5/1998 | Alivisatos et al. |
| 5,780,174 A | 7/1998 | Tokito et al. |
| 5,895,717 A | 4/1999 | Cao et al. |
| 5,958,573 A | 9/1999 | Spitler et al. |
| 6,103,868 A | 8/2000 | Heath et al. |
| 6,157,047 A | 12/2000 | Fujita et al. |
| 6,180,239 B1 | 1/2001 | Whitesides et al. |
| 6,207,229 B1 | 3/2001 | Bawendi et al. |
| 6,236,060 B1 | 5/2001 | Chan et al. |
| 6,251,303 B1 | 6/2001 | Bawendi et al. |
| 6,294,401 B1 | 9/2001 | Jacobson et al. |
| 6,322,901 B1 | 11/2001 | Bawendi et al. |
| 6,379,635 B2 | 4/2002 | O'Brien et al. |

(Continued)

FOREIGN PATENT DOCUMENTS

WO    WO 96/10282    4/1996

(Continued)

OTHER PUBLICATIONS

Cooper et al., "Formation of Polypeptide-Dye Multilayers by an Electrostatic Self-Assembly Technique," Langmuir, 11, pp. 2713-2718 (1995).*

(Continued)

*Primary Examiner*—Ramsey Zacharia
(74) *Attorney, Agent, or Firm*—Steptoe & Johnson LLP (57) ABSTRACT

A high oscillator strength thin film has an absorption constant greater than or equal to $10^6$ cm$^{-1}$.

14 Claims, 7 Drawing Sheets

U.S. PATENT DOCUMENTS

| | | | |
|---|---|---|---|
| 6,447,698 | B1 | 9/2002 | Ihara et al. |
| 6,501,091 | B1 | 12/2002 | Bawendi et al. |
| 6,518,168 | B1 | 2/2003 | Clem et al. |
| 6,551,769 | B2* | 4/2003 | Viaene et al. ............... 430/522 |
| 6,576,291 | B2 | 6/2003 | Bawendi et al. |
| 6,607,829 | B1 | 8/2003 | Bawendi et al. |
| 6,797,412 | B1 | 9/2004 | Jain et al. |
| 6,803,719 | B1 | 10/2004 | Miller et al. |
| 6,846,565 | B2 | 1/2005 | Korgel et al. |
| 6,864,626 | B1 | 3/2005 | Weiss et al. |
| 2001/0005495 | A1 | 6/2001 | O'Brien et al. |
| 2003/0017264 | A1 | 1/2003 | Treadway et al. |
| 2003/0042850 | A1 | 3/2003 | Bertram et al. |
| 2003/0124332 | A1* | 7/2003 | Mao et al. ............... 428/304.4 |
| 2003/0209972 | A1 | 11/2003 | Holmes et al. |
| 2004/0023010 | A1 | 2/2004 | Bulovic et al. |
| 2004/0038007 | A1* | 2/2004 | Kotov et al. ............... 428/174 |
| 2004/0265622 | A1 | 12/2004 | Sadasivan et al. |
| 2005/0258418 | A1 | 11/2005 | Steckel et al. |
| 2006/0159901 | A1 | 7/2006 | Tischler et al. |
| 2006/0196375 | A1 | 9/2006 | Coe-Sullivan et al. |

FOREIGN PATENT DOCUMENTS

| | | |
|---|---|---|
| WO | WO 97/10175 | 3/1997 |
| WO | WO 99/26299 | 5/1999 |
| WO | WO 2005004253 | 1/2005 |
| WO | WO 2005017951 | 2/2005 |

OTHER PUBLICATIONS

Bourbon et al., "Electroluminescence of Self-Assembled Films of Poly (p-phenylene vinylene) and J-Aggregates," Synthetic Metals 1999, 101, 152-153.

Bradley et al., "Layer-by-Layer J-Aggregate Thin Films with a Peak Absorption Constant of $10^6$ cm$^{-1}$," Advanced Materials 2005, 17, 1881-1886.

Decher et al., "Buildup of ultrathin multilayer films by a self-assembly process: III. Consecutively alternating adsorption of anionic and cationic polyelectrolytes on charged surfaces," *Thin Solid Films* 1992, 210, 831-835.

Decher, "Fuzzy Nanoassemblies: Toward Layered Polymeric Multicomposites," *Science*, 1997, 277: 1232-1237.

Era et al., "Double-Heterostructure Electroluminescent Device with Cyanine-Dye Bimolecular Layer as an Emitter," Chem. Phys. Lett. 1991, 178, 488-490.

Fery, "Nanoporous Thin Films Formed by Salt-Induced Structural Changes in Multilayers of Poly(acrylic acid) and Poly(allylamine)," *Langmuir*, 2001, 17(13): 3779-3783.

Fukumoto et al., "Layer-by-layer self-assembly of polyelectrolyte and water soluble cyanine dye," *Thin Solid Films* 1998, 329, 748-751.

Hegarty et al., "Resonant Rayleigh Scattering from an Inhomogeneously Broadened Transition: A New Probe of the Homogeneous Linewidth," *Phys. Rev. Lett.* 1982, 49, 930.

Jelley, *Nature* 1936, 138, 1009-1010.

Mendelsohn, "Fabrication of Microporous Thin Films from Polyelectrolyte Multilayers," *Langmuir*, 2000, 16: 5017-5023.

Shiratori, "pH-Dependent Thickness Behavior of Sequentially Adsorbed Layers of Weak Polyelectrolytes," *Macromolecules*, 2000, 33: 4213-4219.

Ward, "The Optical Constants of Bulk Materials and Films," *IOP Publishing Ltd.* (Bristol, UK 1994).

Adachi et al., "High-efficiency red electrophosphorescence devices", Appl. Phys. Lett. 78, 1622 (2001).

Agranovich et al., "Cavity polaritons in microcavities containing disordered organic semiconductors," *Phys. Rev. B* 2003, 67, 085311.

Aktsipetrov et al. "Generation of reflected second harmonic at semiconductor quantum dots," JETP Letters, vol. 55, No. 8, 435-439 (1992).

Alivisatos, "Perspectives on the Physical Chemistry of Semiconductor Nanocrystals" J. Phys. Chem. 1996(100):13226-13239, 1996.

Baas et al., "Optical bistability in semiconductor microcavities," *Physical Review A* 2004, 69, 023809.

Baltrameyunas et al., "Fast switching of the transmission of light by glasses activated with CdS microcrystals," Sov. Phys. Semicond., vol. 25 No. 2, 164-166 (1991).

Baltramiejunas et al., "Rapid Processes of Darkening and Bleaching in CdS Doped Glasses," Superlattices and Microstructures vol. 10, No. 3, 307-310 (1990).

Berman, Advances in Atomic, Molecular, and Optical Physics, edited by B. Bederson (Academic Press, Inc., New York, 1994).

Bhargava et al., "Quantum Confined Atoms of Doped ZnO Nanocrystals", Phys. Stat. Sol (b) 229, No. 2, 897-901 (2002).

Bulović et al., "Molecular Organic Light-Emitting Devices", *Semiconductors and Semimetals* 2000, 64, 255 (2000).

Chamarro et al., "Enhancement of Exciton Exchange Interaction by Quantum Confinement in CdSe Nanocrystals," Jpn. J. Appl. Phys, vol. 34, 12-14 (1994).

Chamarro et al., "Size-dependent Electron-Hole Exchange Interaction in CdSe Quantum Dots, Il Nuovo Cimento," vol. 17, Nos. 11-12, (1995) 1407-1412.

Chamarro et al., "Enhancement of electron-hole exchange interaction in CdSe nanocrystals; A quantum confinement effect," Physical Review B, vol. 53, No. 3, Jan. 15, 1996-I, 1336-1342.

Chepic et al., "Auger ionization of semiconductor quantum drops in a glass matrix," Journal of Luminescence 47 (1990) 113-127 North-Holland.

Coe et al., "Electroluminescence from single monolayers of nanocrystals in molecular organic devices," *Nature* 2002, 420, 800-803.

Coe-Sullivan et al., "Large-Area Ordered Quantum-Dot Monolayers via Phase Separation During Spin-Casting", Advanced Functional Materials, 15, 1117-1124 (2005).

Colvin et al., "Light-emitting diodes made from cadmium selenide nanocrystals and a semiconducting polymer" Nature 370(6488):354-357, Aug. 4, 1994.

D'Andrade et al., "Bright White Electrophosphorescent Triple-Emissive Layer Organic Light Emitting Device", MRS Fall Meeting, BB6.2 (2001).

Dabbousi et al., "(CdSe)ZnS Core-Shell Quantum Dots: Synthesis and Characterization of a Size Series of Highly Luminescent Nanocrystallites", J. Phys. Chem. B. 101, 9463 (1997).

Dabbousi et al., "Electroluminescence from CdSe quantum-dot/polymer composites" Appl. Phys. Lett. 66(11):1316-1318, Mar. 13, 1995.

Danek et al., "Synthesis of Luminescent Thin-Film CdSe/ZnSe Quantum Dot Composites Using CdSe Quantum Dots Passivated with an Overlayer of ZnSe" Chem. Mater. 8(1):173-180, 1996.

Deng et al., "Condensation of Semiconductor Microcavity Exciton Polaritons," *Science* 2002, 298, 199-202.

Diehl, "Fraunhofer LUCOLEDs to replace lamps," III-Vs Rev. 10(1), 1997.

Dirr et al., "Organic Light Emitting Diodes with Reduced Spectral and Spacial Halfwidths", Jpn. J. Appl. Phys. 37, 1457 (1998).

Dneproviskii et al., "Time-Resolved Luminescence of CdSe Microcrystals," Solid State Communications, vol. 74, No. 7, pp. 555-557 (1990).

Edamatsu et al., "Subpicosecond dynamics of confined excitons and optical nonlinearities of CuCl quantum dots," Journal of Luminescence 66 & 67 (1996) 406-409.

Efros et al., "Resonance Raman Spectroscopy of Electron-Hole Pairs—Polar Phonon Coupling in Semiconductor Quantum Microcrystals," Solid State Communications, vol. 78, No. 10, 853-856 (1991).

Ekimov et al., "Quantum size effect in three-dimensional microscopic semiconductor crystals," JETP Lett, vol. 34, No. 6, Sep. 20, 1981, pp. 345-349.

Ekimov et al., "Quantum size effect in the optical spectra of semiconductor microcrystals," Sov. Phys. Semicond. 16(7), Jul. 1982, pp. 775-778.

Ekimov et al., "Size quantization of the electron energy spectrum in a microscopic semiconductor crystal," JETP Lett., vol. 40, No. 8, Oct. 25, 1984, pp. 1136-1139.

Ekimov et al., "Quantum Size Effect in Semiconductor Microcrystals," Solid State Communications, vol. 56, No. 11, pp. 921-924 (1985).

Ekimov et al., "Quantization of the energy spectrum of holes in the adiabatic potential of the electron," JETP Lett., vol. 43, No. 6, Mar. 25, 1986, pp. 376-379.

Ekimov et al., "Nonlinear Optics of Semiconductor-Doped Glasses," Phys. Stat. Sol. (b) 150, (1988) pp. 627-633.

Ekimov et al., "Photoluminescence of quasizero-dimensional semiconductor structures," Sov. Phys. Solid State 31(8), Aug. 1989, pp. 1385-1393.

Ekimov et al., "Donor-like Exciton in Zero-Dimension Semiconductor Structures," Solid State Communications. vol. 69, No. 5, pp. 565-568 (1989).

Ekimov et al., "Influence of high hydrostatic pressures on the exciton spectrum of CdS microcrystals in glass," Sov. Phys. Semicond. 23(9), Sep. 1989, pp. 965-966.

Ekimov et al., "Quantum-Size Stark Effect in Semiconductor Microcrystals," Journal of Luminescence 46 (1990) 97-100 North-Holland.

Ekimov et al., "Spectra and Decay Kinetics of Radiative Recombination in CdS Microcrystals," Journal of Luminescence 46 (1990) 83-95 North-Holland.

Ekimov et al., "Optics of Zero Dimensional Semiconductor Systems, Acta Physica Polonica A," vol. 79 (1991), No. 1. pp. 5-14.

Ekimov, "Optical Properties of Semiconductor Quantum Dots in Glass Matrix," Physica Scripta, vol. T39, 217-222 (1991).

Ekimov et al., "Dimensional Effects in Luminescence Spectra of Zero-Dimensional Semiconductor Structures," Bulletin of the Russian Academy of Sciences, vol. 56, No. 2, pp. 154-157 (Feb. 1992).

Ekimov et al., "Absorption and intensity-dependent photoluminescence measurements on CdSe quantum dots: assignment of the first electronic transitions," Journal of the Optical Society of America, vol. 10, Nos. 1-12, 100-107 (1992).

Ekimov et al., "Growth of CdSe nanocrystals in ion-implanted $SiO_2$ films," Journal of Crystal Growth 151 (1995) 38-45.

Ekimov, "Growth and optical properties of semiconductor nanocrystals in a glass matrix," Journal of Luminescence 70 (1996) 1-20.

Ekimov, "Optical Properties of Oxide Glasses Doped by Semiconductor Nanocrystals," Radiation Effects and Defects in Solids, 1995, vol. 134, 11-22.

Empedocles et al, "Photoluminescence Spectroscopy of Single CdSe Nanocrystallite Quantum Dots" Phys. Rev. Lett. 77(18):3873-3876 (Oct. 1996).

Empedocles et al., "Quantum-Confined Stark Effect in Single CdSe Nanocrystallite Quantum Dots" Science 278:2114-2117 (Dec. 1997).

Grabovskis, et al., "Photoionization of semiconducting microcrystals in glass," Sov. Phys. Solid State 31(1), Jan. 1989, pp. 149-151.

Guha et al., "Hybrid organic-inorganic semiconductor-based light-emitting diodes" J. Appl. Phys. 82(8):4126-4128 (Oct. 15, 1997).

Gurevich et al., "Growth of CdS nanocrystals in silicate glasses and in thin $SIO_2$ films in the Initial states of the phase separation of a solid solution," Semiconductors, 28 (5), May 1994, 486-493.

Gurevich et al. "Preparation and investigation of $SIO_2$ films activated by CdS semiconductor nanocrystals," Soviet Physics Semiconductors, vol. 26, 57-59 (1992).

Hines et al., "Synthesis and Characterization of Strongly Luminescing ZnS-Capped CdSe Nanocrystals" J. Phys. Chem. 100:468-471 (Jan. 1996).

Houdré et al., "Measurement of Cavity-Polariton Dispersion Curve from Angle-Resolved Photoluminescence Experiments," *Phys. Rev. Lett.* 1994, 73, 2043-2046.

Itoh et al., "Interface effects on the properties of confined excitons in CuCl microcrystals," Journal of Luminescence 60 & 61 (1994) 396-399.

Itoh et al., "Polaron and Exciton-Phonon Complexes in CuCl Nanocrystals," Physical Review Letters, vol. 74, No. 9, Feb. 27, 1995, 1645-1648.

Itoh et al., "Subpicosecond dynamics of confined excitons in CuCl nanocrystals," Materials Science and Engineering A217/218 (1996) 167-170.

Jursenas et al., "Surface Recombination of Nonequilibrium Electron-Hole Plasma in Laser-Modified Semiconductor-Doped Glasses," Solid State Communications, vol. 87, No. 6, 577-580 (1993).

Kagan et al., "Long-range resonance transfer of electronic excitations in close-packed CdSe quantum-dot solids," Physical Review Letters, 54:8633-8643 (Sep. 15, 1996).

Kagan et al., "Electronic Energy Transfer in CdSe Quantum Dot Solids," Physical Review Letters, 76:1517-1520 (1996).

Kavokin et al., "Semiconductor microcavities: towards polariton lasers," *MRS Internet Journal of Nitride Semiconductor Research* 2003, 8(3).

Knupfer, "Exciton binding energies in organic semiconductors," *Applied Physics A: Materials Science & Processing* 2003, 77, 623-626.

Kortan et al., "Nucleation and Growth of CdSe on ZnS Quantum Crystallite Seeds, and Vice Versa, In Inverse Micelle Media" J. Am Chem. Soc. 112:1327-1332 (1990).

Kuno et al., "The band edge luminescence of surface modified CdSe nanocrystallites: Probing the luminescing state" J. Chem. Phys. 106(23):9869-9882 (Jun. 1997).

Lawless et al., "Bifunctional Capping of CdS Nanoparticles and Bridging to $TiO2$" J. Phys. Chem. 99:10329-10335 (1995).

Leatherdale et al., "Photoconductivity in CdSe Quantum Dot Solids," vol. 62, No. 4, pp. 2669-2680, (Jul. 15, 2000).

Lidzey et al., "Room Temperature Polariton Emission from Strongly Coupled Organic Semiconductor Microcavities," *Phys. Rev. Lett.* 1999, 82, 3316-3319.

Lidzey et al., "Experimental study of light emission from strongly coupled organic semiconductor microcavities following nonresonant laser excitation," *Phys. Rev. B* 2002, 65, 195312.

Lublinskaya et al., "CdS nanocrystal growth in thin silica films: evolution of size distribution function", Journal of Crystal Growth 184/185 (1998) 360-364.

Matsumoto et al., "Preparation of Monodisperse CdS Nanocrystals by Size Selective Photocorrosion", J. Phys. Chem.100(32):13781-13785 (1996).

Mattoussi et al., "Electroluminescence from heterostructures of poly(phenylene vinylene) and inorganic CdSe nanocrystals," J. Appl. Phys. 83(12): 7965-7974, 1998.

Murray et al., "Synthesis and Characterization of Nearly Monodisperse CdE (E=S, Se, Te) Semiconductor Nanocrystallites", J. Am. Chem. Soc. 115(19):8706-8715 (1993).

Mobius, Scheibe Aggregates,*Advanced Materials* 1995, 7, 437-444.

Nirmal et al., "Fluorescence Intermittency in single Cadmium Selenide Nanocrystals" Nature 383:802-804 (Oct. 1996).

Reers et al., "J-aggregate formation of a carbocyanine as a quantitative fluorescent indicator of membrane potential," *Biochemistry* 1991, 30, 4480-4486.

Reithmaier et al., "Strong coupling in a single quantum dot—semiconductor microcavity system," *Nature* 2004, 432, 197.

Saba et al., "High-temperature ultrafast polariton parametric amplification in semiconductor microcavities," *Nature* 2001, 414, 731-735.

Saviot et al., "Effects of Resonance on Low-Frequency Raman Scattering From Semiconductor Nanocrystals," Radiation Effects and Defects in Solids, 1995, vol. 137, 45-50.

Saviot et al., "Size dependence of acoustic and optical vibrational modes of CdSe nanocrystals in glasses," Journal of Non-Crystalline Solids 197 (1996) 238-246.

Saviot et al., "Size-selective resonant Raman scattering in CdS doped glasses," Physical Review B, vol. 57, No. 1, Jan. 1, 1998-I, 341-346.

Savona et al., "Quantum well excitons in semiconductor microcavities: Unified treatment of weak and strong coupling regimes," *Solid State Communications* 1995, 93, 733-739.

Schlamp et al., "Improved efficiencies in light emitting diodes made with CdSe(CdS) core/shell type nanocrystals and a semiconducting polymer", J. Appl. Phys., 82, 5837-5842 (1997).

Sirenko et al., "Spin-flip and acoustic-phonon Raman scattering in CdS nanocrystals", Physical Review B, vol. 58, No. 4, 15 (Jul. 1998-II), 2077-2087.

Skolnick et al., "Strong coupling phenomena in quantum microcavity structures," *Semiconductor Science and Technology* 1998, 13, 645-669.

Spanhel et al., "Photochemistry of Colloidal Semiconductors. Surface Modification and Stability of Strong Luminescing CdS Particles" J. Am. Chem. Soc.109(19):5649-5655 (1987).

Tamulaitis et al., "Dynamics of Nonlinear Optical Response of CuBr-Doped Glasses," Superlattices and Microstructures, vol. 3, No. 2, 199-202 (1993).

Tischler et al., "Strong Coupling in a Microcavity LED," Phys. Rev. Lett. 2005, 95, 036401.

Tuszynski et al., "Mechanisms of exciton energy transfer in Scheibe aggregates," Phys. Rev. E 1999, 59, 4374-4383.

Valenta et al., "Dynamics of excitons in CuBr nanocrystals: Spectral-hole burning and transient four-wave-mixing measurements," Physical Review B, vol. 57, No. 3, Jan. 15, 1998-I, 1774-1783.

Vanburgel, M., et al., "The dynamics of one-dimensional excitons in liquids," J. Chem. Phys. 1995, 102, 20-33.

Vandyshev et al., "Nonlinear optical properties of semiconductor microcrystals," JETP Lett., vol. 46, No. 10, Nov. 25, 1987 pp. 435-439.

Volkov et al., "Oscillations of polarization of recombination radiation of a variable gap semiconductor in a magnetic field," JETP Lett., vol. 25 No. 55, 526-528 (1977).

Weisbuch et al., "Observation of the coupled exciton-photon mode splitting in a semiconductor quantum microcavity," Phys. Rev. Lett. 1992, 69, 3314-3317.

Yamasaki et al., "Organic light-emitting device with an ordered monolayer of silica microspheres as a scattering medium", Appl. Phys. Lett. 76, 1243-1245 (2000).

Yoshie et al., "Vacuum Rabi splitting with a single quantum dot in a photonic crystal nanocavity," Nature 2004, 432, 200.

Holmes et al., "Strong exciton-photon coupling and exciton hybridization in a thermally evaporated polycrystalline film of an organic small molecule." Phys. Rev. Lett., vol. 93 (18), 2004.

Lidzey et al., Strong exciton-photon coupling in an organic semiconductor microcavity. Nature, vol. 395, 53-55, 1998.

Lidzey et al., "Photon-mediated hybridization of Frenkel excitons in organic semiconductor microcavities", Science, vol. 288, 1620-1623, 2000.

Litinskaya et al., "Exciton-polaritons in a crystalline anisotropic organic microcavity." Phys. Stat. Sol. A, vol. 201 (4), 646-654, 2004.

Oulton et al., "Strong coupling in organic semiconductor microcavities." Semicon. Sci. Tech., vol. 18, S419-S427, 2003.

Schouwink et al., "Observation of strong exciton-photon coupling in an organic microcavity", Chem Phys Lett., vol. 344, 352-356, 2001.

Takada et al., "Polariton emission from polysilane-based organic microcavities", Appl Phys Lett., vol. 82(12), 1812-1824, 2003.

Vuckovic et al., "Surface plasmon enhanced LED." IEEE Technical Digest: QELS Conference, 41-42, 2000.

Connolly et al., "Strong coupling in high finesse organic semiconductor microcavities." Appl. Phys. Lett., vol. 83 (26), 5377-5379, 2003.

Hobson et al. "Strong exciton—photon coupling in a low-Q all-metal mirror microcavity," Applied Physics Letters 2002, 81, 3519-3521.

Klimovitch et al., "Direct creation of quantum well excitons and microcavity exciton polaritons tunneling and phonon emission: Fundamental physics and device applicants." PhD Thesis, Stanford University, UMI microfilm 9924448, (1999).

* cited by examiner

ABSORBING FILM

CLAIM OF PRIORITY

This application claims priority to provisional U.S. patent application Ser. No. 60/624,198, filed Nov. 3, 2004, which is incorporated by reference in its entirety.

FEDERALLY SPONSORED RESEARCH OR DEVELOPMENT

This invention was made with government support under Grant Number MDA972-00-1-0023, awarded by DARPA. The government has certain rights in the invention.

TECHNICAL FIELD

The present invention relates to a light absorbing film.

BACKGROUND

Light-emitting devices can be used, for example, in displays (e.g., flat-panel displays), screens (e.g., computer screens), and other items that require illumination. Accordingly, the brightness of the light-emitting device is one important feature of the device. Also, low operating voltages and high efficiencies can improve the viability of producing emissive devices.

Light-emitting devices can release photons in response to excitation of an active component of the device. Emission can be stimulated by applying a voltage across the active component (e.g., an electroluminescent component) of the device. The electroluminescent component can be a polymer, such as a conjugated organic polymer or a polymer containing electroluminescent moieties or layers of organic molecules. Typically, the emission can occur by radiative recombination of an excited charge between layers of a device. The emitted light has an emission profile that includes a maximum emission wavelength, and an emission intensity, measured in luminance (candelas/square meter ($cd/m^2$) or power flux ($W/m^2$)). The emission profile, and other physical characteristics of the device, can be altered by the electronic structure (e.g., energy gaps) of the material. For example, the brightness, range of color, efficiency, operating voltage, and operating half-lives of light-emitting devices can vary based on the structure of the device.

SUMMARY

In general, a high oscillator strength thin film can be applied to a surface. The film can have an absorption coefficient greater than $10^5$ cm$^{-1}$, for example, greater than or equal to $10^6$ cm$^{-1}$. Thin films characterized by a high absorption coefficient and methods for making such films are provided. The films are formed by adsorption into layered structures of charged species with strong dipole-dipole interactions between species. The films are built by adsorption of species with alternating charge on a solid substrate e.g., glass, silicon, a polymer surface, or a previous polymer film disposed on a substrate, etc.

The high absorption coefficient arises from the interaction of dipoles in a plane perpendicular to the probe direction. The process used to form these films allows for strong dipole interactions within the adsorbed layer. Additionally, the process allows for precise deposition of a single physical layer of the dipole-dipole-interacting absorbing species. As a result, the dipole-dipole interactions in the plane of absorbing species perpendicular to the probe direction provide a high absorption constant in the thin film.

In one aspect, a light absorbing film includes a light absorbing material and a multiply charged material adjacent to the light absorbing material, wherein the light absorbing material and the multiply charged material interact noncovalently. A first molecule of the light absorbing material can form a dipole-dipole interaction with a second molecule of the light absorbing material. The light absorbing material can be a J-aggregate. The light absorbing material can include a cyanine dye. The film can have an absorption coefficient of at least $10^5$ cm$^{-1}$ at a wavelength between 100 nm and 10,000 nm; of at least $10^5$ cm$^{-1}$ at a wavelength between 300 nm and 700 nm; of at least $10^5$ cm$^{-1}$ at a wavelength between 700 nm and 2,000 nm; of at least $10^6$ cm$^{-1}$ at a wavelength between 100 nm and 10,000 nm; of at least $10^6$ cm$^{-1}$ at a wavelength between 300 nm and 700 nm; or of at least $10^6$ cm$^{-1}$ at a wavelength between 700 nm and 2,000 nm.

In another aspect, a method of forming a light absorbing film includes contacting a substrate with a multiply charged material, and contacting the substrate with a light absorbing material having an opposite charge. Contacting the substrate with a multiply charged material includes contacting the substrate with a solution of the multiply charged material. Contacting the substrate with a light absorbing material can include contacting the substrate with a solution of the light absorbing material. Contacting the substrate with the multiply charged material includes forming a layer of the multiply charged material on the substrate. Contacting the substrate with a light absorbing material can include forming a layer of light absorbing material adjacent to the layer of multiply charged material.

The multiply charged material can include a polyelectrolyte. The polyelectrolyte can be a polycation or polyanion. The multiply charged material can include a metal ion. The light absorbing material and the multiply charged material can form an electrostatic bilayer. The film can include a plurality of electrostatic bilayers arranged in a multilayer.

In another aspect, a light absorbing film includes a plurality of electrostatic bilayers. Each bilayer includes a first layer including a light absorbing material, and a second layer adjacent to the first layer, the second layer including a multiply charged material.

In another aspect, a method of forming a light absorbing film includes sequentially depositing a plurality of electrostatic bilayers on a substrate. Each bilayer includes a first layer including a light absorbing material, and a second layer adjacent to the first layer, the second layer including a multiply charged material.

Other features, objects, and advantages will be apparent from the description and drawings, and from the claims.

DETAILED DESCRIPTION

Thin films having a high oscillator strength (i.e., absorption coefficient) can be made by alternately adsorbing two or more materials capable of non-covalent interaction onto a support or substrate from solution, where one material is a light absorbing material. The non-covalent interaction can be, for example, an electrostatic interaction or hydrogen bonding.

Selection of appropriate materials and assembly conditions can result in a film where the light absorbing material participates in strong dipole-dipole interactions, favoring a high absorption coefficient. The light absorbing material can be a dye capable of forming a J-aggregate.

Layers of light absorbing material, which can be positively or negatively charged, can be interspersed with layers of an oppositely charged material. The oppositely charged material can include a multiply charged species. A multiply charged species can have a plurality of charge sites each bearing a partial, single, or multiple charge; or a single charge site bearing a multiple charge. A polyelectrolyte, for example, can have a plurality of charge sites each bearing a partial, single, or multiple charge. A polyelectrolyte has a backbone with a plurality of charged functional groups attached to the backbone. A polyelectrolyte can be polycationic or polyanionic. A polycation has a backbone with a plurality of positively charged functional groups attached to the backbone, for example poly(allylamine hydrochloride). A polyanion has a backbone with a plurality of negatively charged functional groups attached to the backbone, such as sulfonated polystyrene (SPS), polyacrylic acid, or a salt thereof. Some polyelectrolytes can lose their charge (i.e., become electrically neutral) depending on conditions such as pH. Some polyelectrolytes, such as copolymers, can include both polycationic segments and polyanionic segments. The charge density of a polyelectrolyte in aqueous solution can be pH insensitive (i.e., a strong polyelectrolyte) or pH sensitive (i.e., a weak polyelectrolyte). Without limitation, some exemplary polyelectrolytes are poly diallyldimethylammonium chloride (PDAC, a strong polycation), poly allylamine hydrochloride (PAH, a weak polycation), sulfonated polystyrene (SPS, a strong polyanion), and poly acrylic acid (PAA, a weak polyanion). Examples of a single charge site bearing a multiple charge include multiply charged metal ions, such as, without limitation, $Mg^{2+}$, $Ca^{2+}$, $Zn^{2+}$, $Fe^{2+}$, $Fe^{3+}$, $Co^{2+}$, $Cu^{2+}$, $Cd^{2+}$, $Sn^{4+}$, $Eu^{3+}$, $Tb^{3+}$, and the like. Multiply charged metal ions are available as salts, e.g. chloride salts such as $CoCl_2$, $FeCl_3$, $EuCl_3$, $TbCl_3$, $CdCl_2$, and $SnCl_4$.

The film can include hydrogen bonding polymers, such as, for example, polyacrylamide (PAm), polyvinylpyrolidone (PVP), and polyvinyl alcohol (PVA). The light absorbing film can include more than two materials. One of these materials is the light absorbing material and one of the other materials is either a multivalent ionic species or hydrogen bonding polymer. Additional materials may be included in the film to promote crosslinking, adhesion, or to sensitize light emission or absorption.

The thin films can include one or several layers of a polyelectrolyte and one or more charged species with strong dipole-dipole interactions and any additional dopants. At least one of the charged species used for strong dipole-dipole interactions has a charge opposite that of the polyelectrolyte used for the scaffold. When sequentially applied to a substrate, the oppositely charged materials attract forming an electrostatic bilayer. The polyelectrolyte provides a scaffold for the species with strong dipole-dipole interactions to form a layered structure. These films are compatible with other processes of building thin films through alternate adsorption of charged species. The films can be interspersed in a multifilm heterostructure with other thin films.

The charged species with strong dipole-dipole interactions can be a single type of species, such as a single type of J-aggregating material (for example, a cyanine dye). Alternatively, several charged species with strong dipole-dipole interactions among the species could be used. The species used for the strong dipole-dipole interacting layer can have individual dipoles that can couple together to produce a coherent quantum mechanical state. This allows for the buildup of coherence in two dimensions, producing effects in the probe dimension perpendicular to the interacting species.

J-aggregates of cyanine dyes have long been known for their strong fluorescence. This strong fluorescence makes J-aggregates a desirable candidate for use in organic light-emitting devices (OLEDs), and these devices have been demonstrated. The layer-by-layer (LBL) technique for film growth, first developed by Decher et al., was extended to create thin films of J-aggregates, which have been to create an OLED with J-aggregates as emitters. See, for example, E. E. Jelley, *Nature* 1936, 138, 1009; M. Era, C. Adachi, T. Tsutsui, S. Saito, *Chem. Phys. Lett.* 1991, 178, 488; G. Decher, J. D. Hong, J. Schmitt, *Thin Solid Films* 1992, 210, 831; H. Fukumoto, Y. Yonezawa, *Thin Solid Films* 1998, 329, 748; S. Bourbon, M. Y. Gao, S. Kirstein, *Synthetic Metals* 1999, 101, 152; Bradley, M. S. et al., *Advanced Materials* 2005, 17, 1881; and provisional U.S. Patent Application Ser. No. 60/624,187, filed Nov. 3, 2004, each of which is incorporated by reference in its entirety.

Layer-by-layer (LBL) processing of polyelectrolyte multilayers can be utilized to fabricate conformal thin film coatings with molecular level control over film thickness and chemistry. Charged polyelectrolytes can be assembled in a layer-by-layer fashion. In other words, positively- and negatively-charged polyelectrolytes can be alternately deposited on a substrate. One method of depositing the polyelectrolytes is to contact the substrate with an aqueous solution of polyelectrolyte at an appropriate pH. The pH can be chosen such that the polyelectrolyte is partially or weakly charged. The multilayer can include a number of electrostatic bilayers. An electrostatic bilayer is the structure formed by the ordered application of a mulitply charged species (e.g., a polyelectrolyte or metal ion) and an oppositely charged material (e.g., a light absorbing material, polyelectrolyte or counterion). The properties of weakly charged polyelectrolytes can be precisely controlled by changes in pH. See, for example, G. Decher, Science 1997, 277, 1232; Mendelsohn et al., *Langmuir* 2000, 16, 5017; Fery et al., *Langmuir* 2001, 17, 3779; Shiratori et al., *Macromolecules* 2000, 33, 4213, each of which is incorporated by reference in its entirety.

The process conditions used in the deposition of the film can be varied. Some process conditions that can be varied include concentration, temperature, pH, salt concentration, co-solvent, co-solvent concentration, and deposition time. The temperature can be varied between, for example, 0° C. and 100° C., or between 5° C. and 80° C. The pH can be varied from 0.0 to 14.0, or from 3.0 to 13.0. The salt concentration can range from deionized (i.e., no salt added) to 1 M. NaCl and KCl are examples of salts used. Solutions can be prepared using water as the sole solvent, or with water and a co-solvent, such as an organic solvent. Some exemplary organic solvents include methanol, ethanol, isopropanol, acetone, acetic acid, THF, dioxane, DMF, and formamide. The deposition time can be 1 second or less; 30 seconds or less; 1 minute or less; 5 minutes or less; 10 minutes or less; 1 hour or less; or several hours or more. In some circumstances, deposition times will be in the range of 1 second to 10 minutes.

The density of the film can be modified by repeatedly immersing the substrate into solutions of the light absorbing material prepared with different process conditions. As an example, by cyclically immersing into a solution held at a temperature of 20° C. and then in a second solution held at 60° C. The crystallinity of the resultant film is enhanced and dye density increased compared to films not treated in this manner.

The film can include a plurality of bilayers, such as fewer than 100, fewer than 50, fewer than 20, or fewer than 10 bilayers. The film can include 0.5, 1.0, 1.5, 2.0, 2.5, 3.0, 3.5, 4.0, 4.5, 5.0, 5.5., 6.0, 6.5, 7.0, 7.5, 8.0, 8.5, 9.0, 9.5, or 10.0 bilayers. A bilayer includes a layer of multiply charged material and a layer of light absorbing material. In some embodiments, the film can include bilayers substantially free of light absorbing material, e.g., bilayers where one layer includes a polycation and the other layer includes a polyanion. Including bilayers that are substantially free of light absorbing material can be advantageous, for example, in altering the adhesion of the film to a substrate or in altering the thickness of the film.

The light absorbing film can be deposited on a hydrophilic or hydrophobic substrate. The film can be deposited onto conducting (e.g., metallic), semiconducting, or insulating layers; or bio-compatible materials, examples of which are a polymer film that is hydrophilic or hydrophobic, an oxide layer, a metal oxide layer, a metal layer, a DNA-coated surface, and others. Examples of a hydrophilic polymer layer include polyelectrolytes and hydrogen bonding polymers; amino acids; proteins; and hydrophilic polymers. Examples of hydrophobic polymers include PDMS, Poly-TPD, and MEH-PPV. Metal oxide layers include, for example alumina, titania, and zinc oxide. Examples of semiconducting layers are layers of Si, Ge, GaAs, GaN, AlGaAs, GaAsP, CdSe, CdS, ZnS, and metal halides, such as AgCl, AgBr, and AgI. Adhesion of the light absorbing film to the substrate can be promoted by varying the process conditions described above.

Figure 1:
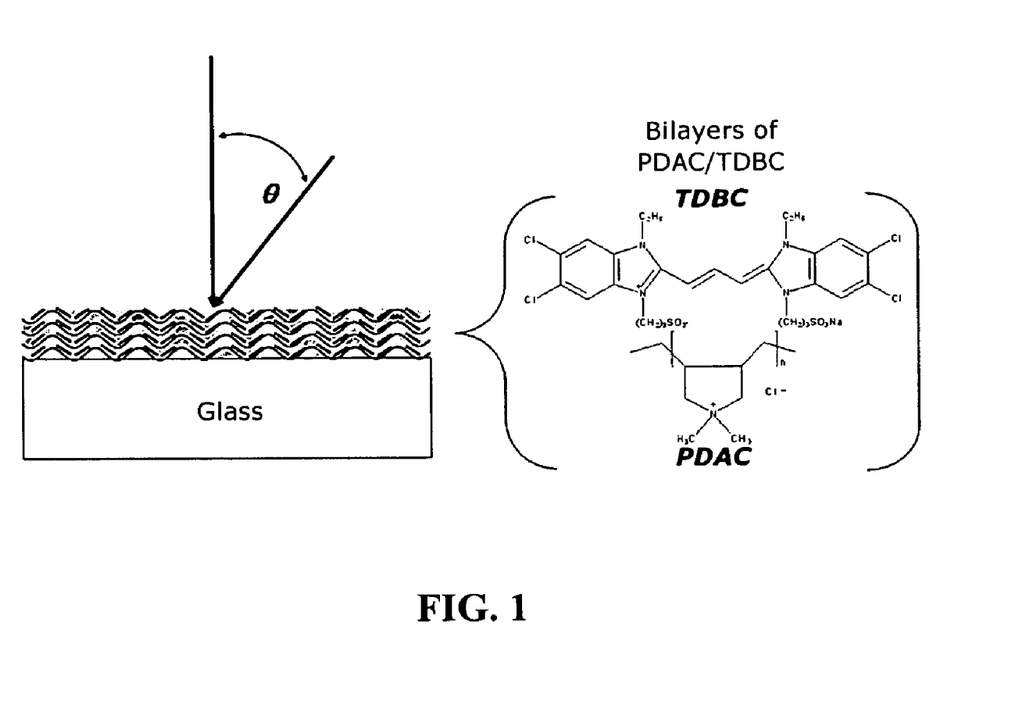
FIG. 1 is a schematic diagram depicting a bilayer structure.

Samples of LBL TDBC J-aggregate films were prepared on glass and used to probe the optical and morphological properties of the films. FIG. 1 shows a schematic of the sample bilayer (bilayer) structure and the chemical structures of the thin film constituents. The polycation used in the LBL growth was poly diallyldimethylammonium chloride (PDAC), and the anion was TDBC (5,6-dichloro-2-[3-[5,6-dichloro-1-ethyl-3-(3-sulfopropyl)-2(3H)-benzimidazolidene]-1-propenyl]-1-ethyl-3-(3-sulfopropyl) benzimidazolium hydroxide, inner salt, sodium salt), a J-aggregate forming cyanine dye. Optical measurements were taken with the LBL-film side of the sample facing the beam. For analysis, the samples were modeled as regions of air, J-aggregate film, thick glass, and air.

Figure 2:
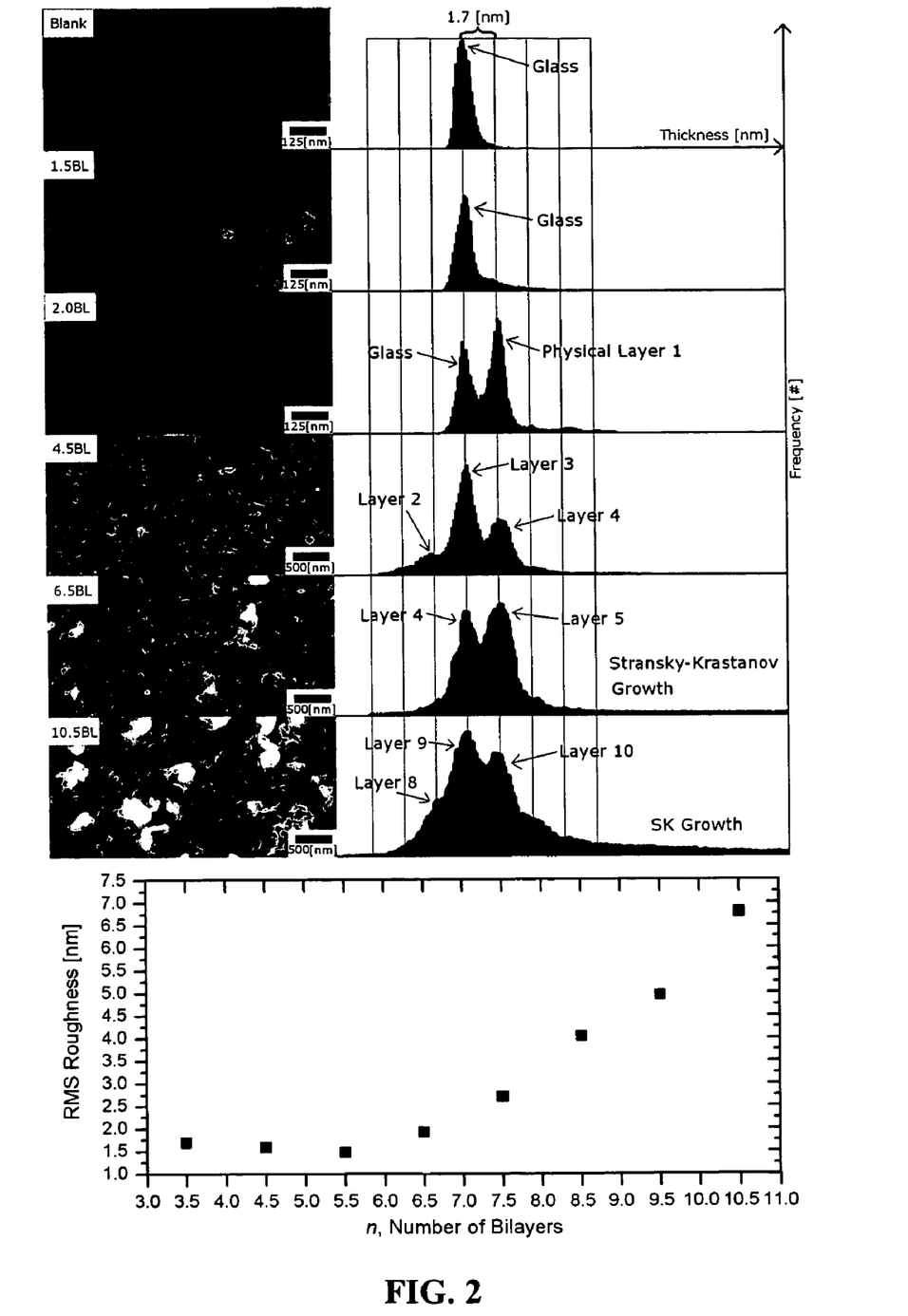
FIG. 2 depicts AFM images and data of layered structures.

Samples with different numbers of PDAC/TDBC bilayer were produced in order to observe the film structure at various stages of growth using atomic force microscopy (AFM). FIG. 2 shows AFM images throughout the various stages of growth. In addition, FIG. 2 shows a plot of RMS roughness versus the number of bilayers deposited.

In FIG. 2, each bilayer was made by a PDAC adsorption step followed by a TDBC adsorption step, with half bilayer referring to an additional PDAC adsorption step. The top three images show samples before and at the start of layered growth at 2.0 bilayers. The bottom three images show the build-up of thick layers. The histograms are lined up at the dominant film thicknesses to show that each physical layer is about 1.7 nm thick, the estimate used when modeling the films. The plot shows the roughness profile of thick films, from 3.5 to 10.5 bilayers. The roughness is nearly constant until 6.5 bilayers, when the growth regime changes from layered to Stransky-Krastanov (SK). All images have a vertical scale of 50 nm.

As shown in the images of glass, 1.5 bilayers, and 2.0 bilayers (FIG. 2), the full layered structure of the LBL TDBC J-aggregate films did not appear until the second dye layer has been adsorbed. The images of thick films show that layered growth was still dominant at 4.5 bilayers, but at 6.5 bilayers and 10.5 bilayers the growth had shifted to a Stransky-Krastanov (SK) type of process, forming large islands of material. To quantify the growth trend, RMS roughness was measured on 16 $\mu m^2$ AFM images of films with 3.5 to 10.5 bilayers. The plot in FIG. 2 shows that a mostly constant roughness of 1.4 to 2.0 nm persisted through 5.5 bilayers, indicating layered growth. At 6.5 bilayers, the roughness started increasing with each new bilayer deposited, indicating the shift to SK growth.

The thickness data obtained from the AFM measurements were used along with data from optical measurements to extract the optical constants of LBL TDBC J-aggregate films. Transmittance and reflectance measurements were performed for samples with different numbers of bilayers adsorbed. FIG. 3 shows plots of reflectance and transmittance data for the sample structures shown in FIG. 1. Absorbance was obtained from measured transmittance data using the definition of absorbance as $\log_{10}(1/T)$, where T is the transmittance. FIGS. 3A-3F also show plots of the full-width half-maximum (FWHM) and energy of the peak in absorbance. The reflectance and transmittance of the samples were used with the thickness data from the AFM to make a least-squared error (LSE) fit of the index of refraction of the LBL TDBC J-aggregate films at a wavelength of 594 nm. A model based on propagation and matching matrices representing the layers and interfaces of the structure in FIG. 1 was used for the fit. See, for example, L. Ward. *The Optical Constants of Bulk Materials and Films* (IOP Publishing Ltd.: Bristol, UK), 1994, which is incorporated by reference in its entirety. This fit was also shown in FIG. 3.

Figure 3A:
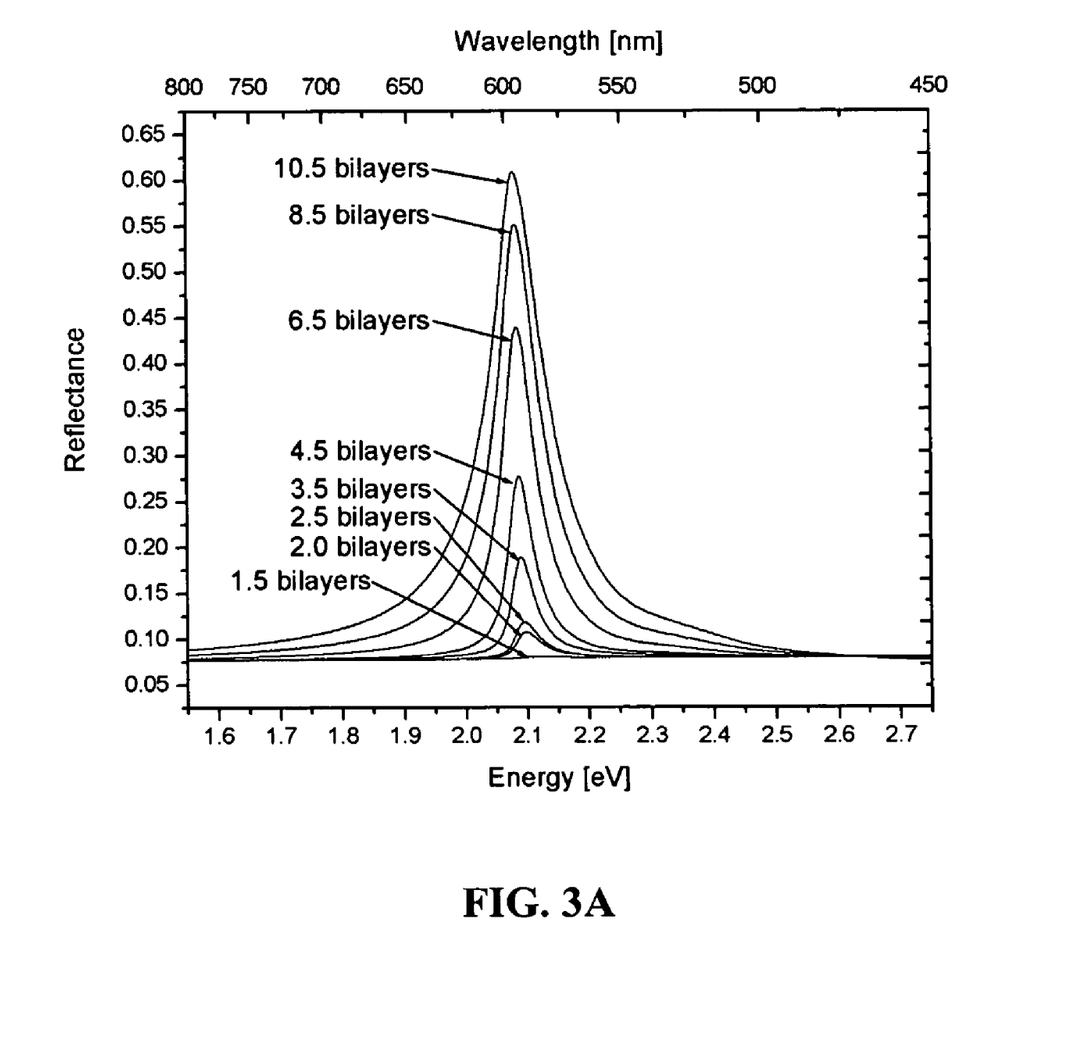
FIGS. 3A-3F are graphs depicting optical properties of layered structures.
Figure 3B:
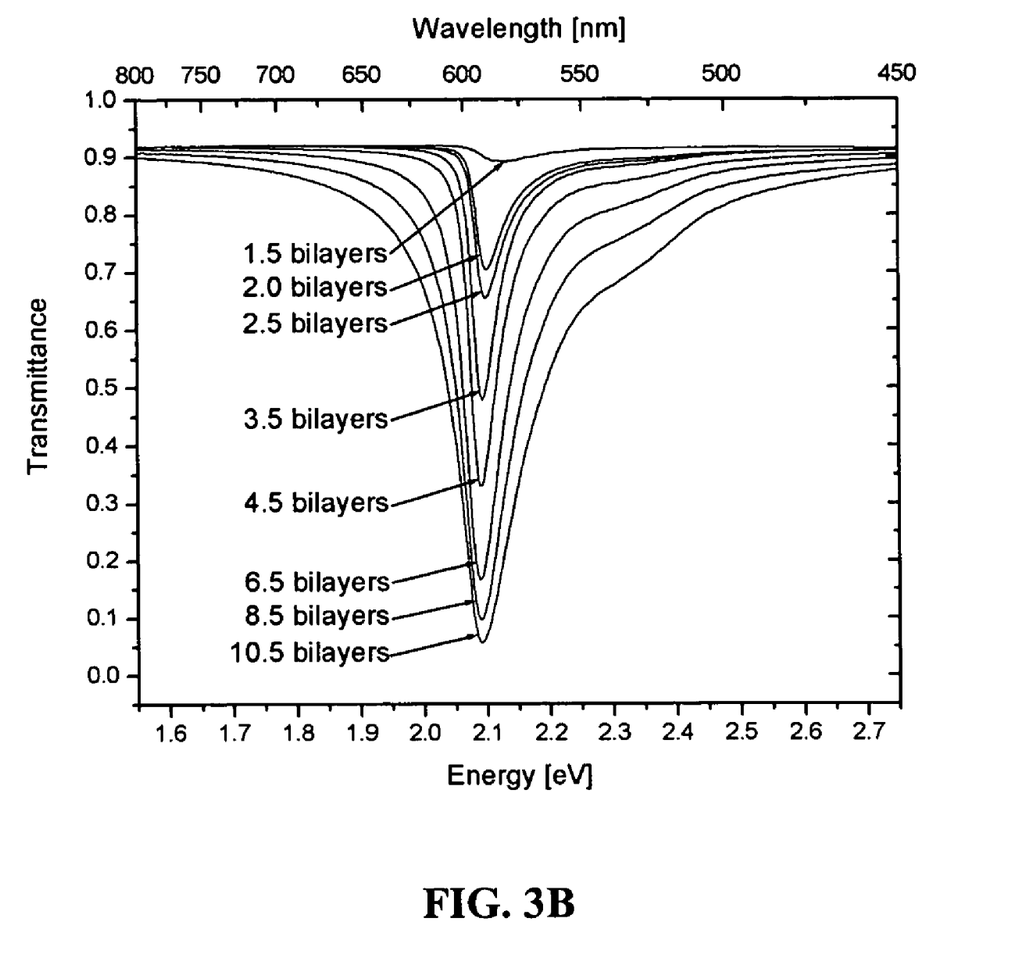
Figure 3C:
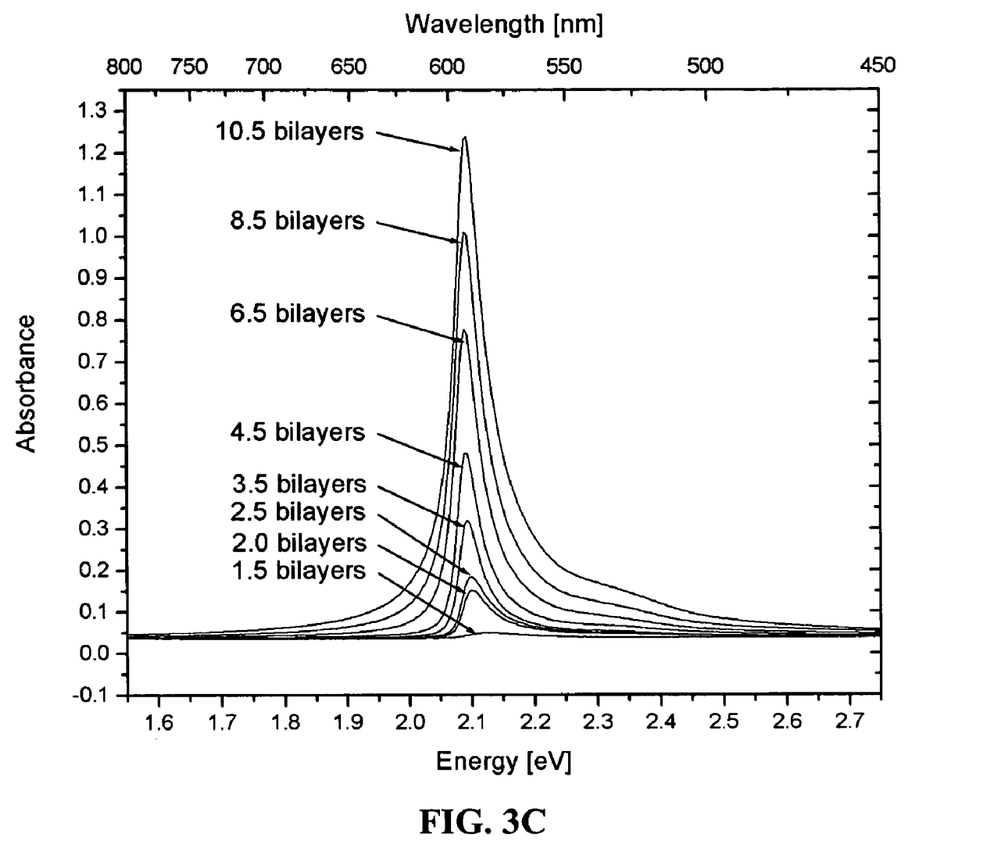
Figure 3D:
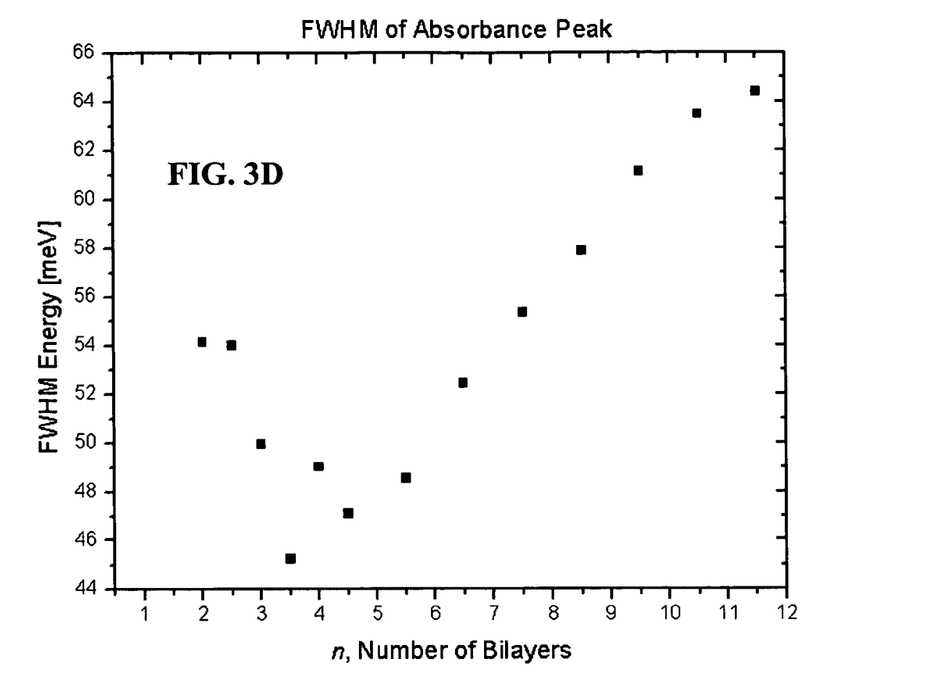
Figure 3E:
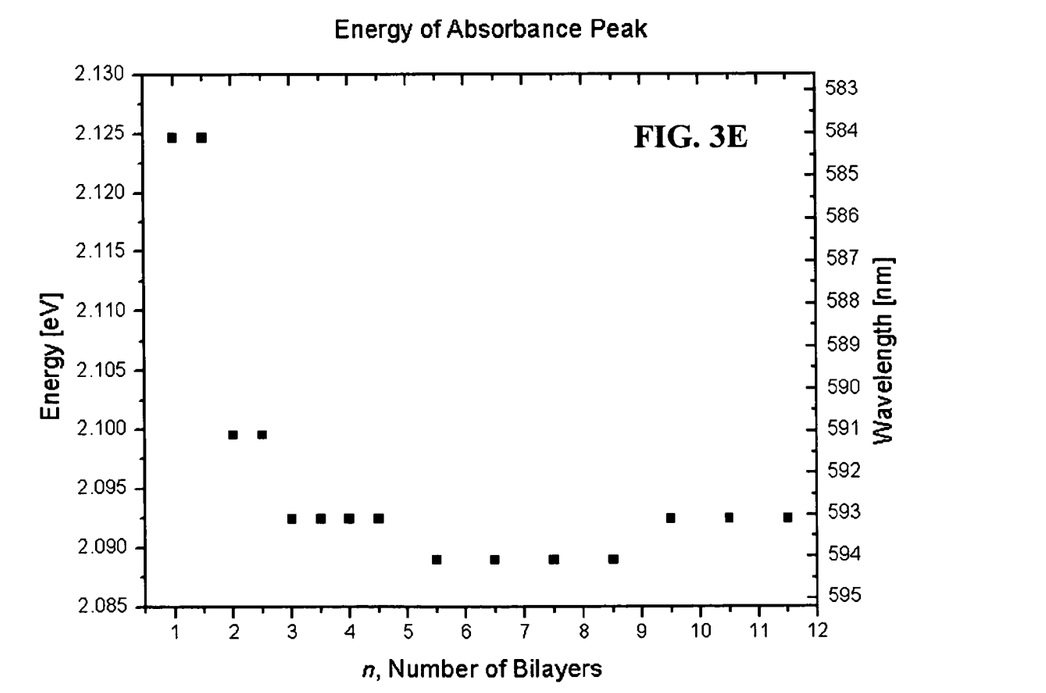
Figure 3F:
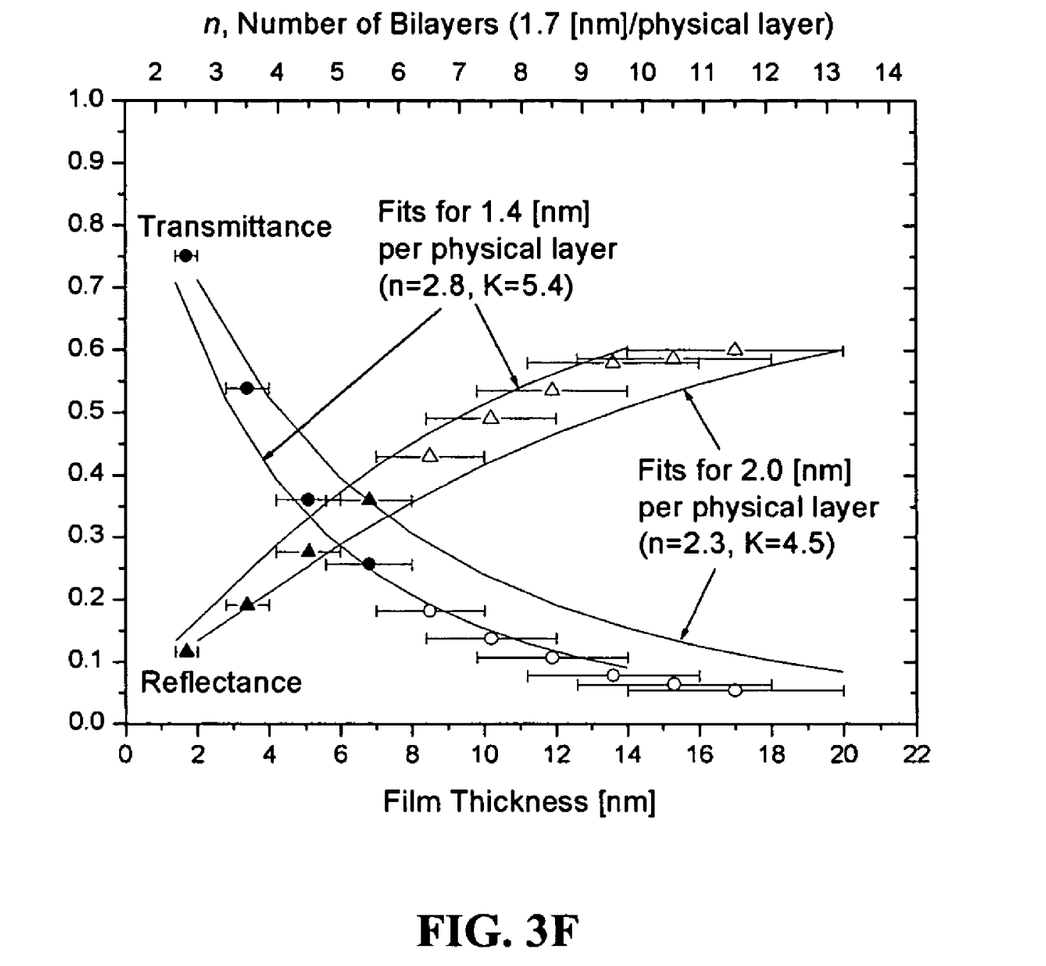

FIGS. 3A and 3B show reflectance and transmittance data collected for a different numbers of bilayers adsorbed. FIG. 3C shows absorbance data from the same samples, constructed using the collected transmittance data. FIGS. 3D and 3E show the FWHM and energy of the peak in absorbance as a function of number of bilayer adsorbed. FIG. 3F shows the collected transmittance and reflectance data plotted with predictions from modeling the samples. The model consisted of propagation and matching matrices for the sample structure shown in FIG. 1. A least-squared error method was used to fit the index of refraction at a wavelength of 594 nm using only the points in black. The points in black are for samples where layered growth was dominant. The outlined points are for samples where SK growth caused a significant change in measured RMS roughness. For these points, the thickness shown for the outlined points is an estimate of the layered portion, not the SK portion. The two fits plotted show the range in the index of refraction.

From the AFM data collected, the physical layers deposited were observed to vary in thickness from about 1.4 to 2.0 nm. Based on this estimate of physical film thickness per adsorbed bilayer, the index of refraction was fit through the use of a propagation and matching matrix model of the sample structure. The model calculated transmittance and 7-degree-incident reflectance values based on the light traveling through air, a LBL TDBC J-aggregate film, the glass slide, and then air. A range for the index of refraction was obtained by fitting for films with 1.4 to 2.0 nm per physical layer for every full bilayer adsorbed. Since no physical layer was evident for the first 1.5 bilayers adsorbed, the first physical layer's data corresponded to a sample with 2.5 bilayers adsorbed. Using this method, the index of refraction was estimated to have a real part between 2.3 and 2.8 and an imaginary part between 4.5 and 5.4. The high extinction coefficient corresponds to an absorption coefficient in the range of $1.05 \pm 0.1 \times 10^6$ $cm^{-1}$. Despite the observed presence of thick SK growth in samples with more than 5.5 bilayers adsorbed, the samples' optical properties can be predicted by treating the samples as having only thin layered growth.

The transmittance predicted by the model diverged slightly from the collected data as the number of bilayers increased. This may be due to a number of phenomena that are not considered in the model. As can be seen in FIG. 3B, a high energy shoulder was present in transmittance that may account for some of the difference between predicted and measured transmittance. Additionally, resonant Rayleigh scattering could be significant since the index of refraction was being examined on or near resonance. See, for example, J. Hegarty, et al. *Phys. Rev. Lett.* 1982, 49, 930, which is incorporated by reference in its entirety. Small variations in the film could cause large local shifts in the index of refraction, which may explain the divergence in measured and predicted transmittance. Lastly, the model did not account for a distribution of thicknesses in the physical layers or that each physical layer may not fully cover the sample, either of which could contribute to the difference between predicted and measured transmittance.

The morphological and optical properties of LBL thin films of J-aggregates of TDBC cyanine dye have been measured. The growth regime was strictly layered up to the adsorption of the fourth physical layer, after which SK growth becomes considerable. The high absorption coefficient of the films demonstrated the viability of LBL thin film J-aggregates for use in devices, especially when significant interaction with light is desired, as in the case of polariton-emitting OLEDs.

Experimental

J-aggregate thin films were produced using a layer-by-layer deposition method. Layers of polyelectrolyte and J-aggregate-forming dye were alternately adsorbed onto glass slides. The dye used was 5,6-dichloro-2-[3-[5,6-dichloro1-ethyl-3-(3-sulfopropyl)-2(3H)-benzimidazolidene]-1-propenyl]-1-ethyl-3-(3-sulfopropyl) benzimidazolium hydroxide, inner salt, sodium salt obtained from Nippon Kankoh Shikiso Kenkyusho Co., Ltd. (CAS 28272-54-0). The polyelectrolyte used was Poly(diallyldimethylammonium chloride), 20% by weight in water, $M_w$=400,000-500,000, obtained from Sigma-Aldrich (CAS 26062-79-3). The dye solvent and rinses for the dye adsorption step were approximately pH 9 solutions of deionized (DI) water plus sodium hydroxide. The sodium hydroxide was obtained from EM Science. The polyelectrolyte solvent and rinses for the polyelectrolyte adsorption step were DI water. The dye solution was approximately $5 \times 10^{-5}$ M. Once the dye was added to the dye solvent, the dye bucket was placed in a VWR ultrasonic cleaner to sonicate for 30 minutes. The dye was then mixed with a one-inch magnetic spin bar for 10 minutes, sonicated for 20 minutes, mixed for 5 minutes, and finally sonicated for 5 minutes. The polyelectrolyte solution was approximately $3 \times 10^{-2}$ M, prepared by adding 10 mL of polyelectrolyte to 400 mL of DI water. The polyelectrolyte solution was prepared using the same time lengths as the dye solution preparation, except sonication and mixing at each step were swapped. Care was taken throughout the deposition to shield the dye solution and samples from light.

Prior to the deposition, the glass slides were cleaned with a detergent solution (Micro-90), acetone, and isopropanol. The acetone, isopropanol, and methanol used in this study were OmniSolv-brand solvents made by EMD Chemicals. The slides were then treated with oxygen plasma for six minutes in a Plasma Preen system. The layer-by-layer deposition was performed using a Leica Autostainer XL. The stainer was controlled by a program running in National Instruments LabVIEW 6.1. The polyelectrolyte adsorption step consisted of dipping the slides in polyelectrolyte solution for 15 minutes and in the three polyelectrolyte rinses for two minutes, two minutes, and one minute respectively. The dye adsorption step used the same times for the dye solution and dye rinses as the times used in the polyelectrolyte adsorption step.

Upon removal from the stainer, each sample was blown dry using nitrogen gas. For each sample, the side that was not treated with oxygen plasma prior to deposition was then cleaned using methanol to remove the deposited layers from the back.

The AFM data were collected on a Digital Instruments D3100 Scanning Probe Microscope in tapping mode using silicon-nitride tips from Veeco. The optical data were collected using a Cary 5E UV-Vis-NIR spectrophotometer. The transmission data were collected with the light beam at normal incidence with a baseline of a clean, blank glass slide. This baseline was accounted for in the model by adjusting the predicted transmittance of a sample by the predicted transmittance for a blank slide with no J-aggregate layer. The reflectance data were collected in a V-W setup with the light beam at seven-degree incidence using the Cary Surface Reflectivity Accessory in Absolute Reflectivity mode.

Other embodiments are within the scope of the following claims.

What is claimed is:

1. A light absorbing film comprising a light absorbing material and a polymeric multiply charged material adjacent to the light absorbing material, wherein the light absorbing material and the polymeric multiply charged material interact noncovalently, wherein the polymeric multiply charged material includes a polyanion, wherein the light absorbing material is fluorescent, wherein the light absorbing material is a J-aggregate.

2. The film of claim 1, wherein a first molecule of the light absorbing material forms a dipole-dipole interaction with a second molecule of the light absorbing material.

3. The film of claim 1, wherein the light absorbing material includes a cyanine dye.

4. The film of claim 1, wherein the film has an absorption coefficient of at least $10^5$ cm$^{-1}$ at a wavelength between 100 nm and 10,000 nm.

5. The film of claim 1, wherein the film has an absorption coefficient of at least $10^5$ cm$^{-1}$ at a wavelength between 300 nm and 700 nm.

6. The film of claim 1, wherein the film has an absorption coefficient of at least $10^5$ cm$^{-1}$ at a wavelength between 700 nm and 2,000 nm.

7. The film of claim 1, wherein the film has an absorption coefficient of at least $10^6$ cm$^{-1}$ at a wavelength between 100 nm and 10,000 nm.

8. The film of claim 1, wherein the film has an absorption coefficient of at least $10^6$ cm$^{-1}$ at a wavelength between 300 nm and 700 nm.

9. The film of claim 1, wherein the film has an absorption coefficient of at least $10^6$ cm$^{-1}$ at a wavelength between 700 nm and 2,000 nm.

10. The film of claim 1, wherein the polymeric multiply charged material includes a second polyelectrolyte.

11. The film of claim 10, wherein the second polyelectrolyte is a polycation.

12. The film of claim 1, wherein the polymeric multiply charged material includes a metal ion.

13. The film of claim 1, wherein the light absorbing material and the polymeric multiply charged material form an electrostatic bilayer.

14. The film of claim 13, further comprising a plurality of electrostatic bilayers arranged in a multilayer.

* * * * *